(12) United States Patent
Cobb et al.

(10) Patent No.: US 6,522,474 B2
(45) Date of Patent: *Feb. 18, 2003

(54) HEAD-MOUNTED OPTICAL APPARATUS FOR STEREOSCOPIC DISPLAY

(75) Inventors: Joshua M. Cobb, Victor, NY (US); John A. Agostinelli, Rochester, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/878,701

(22) Filed: Jun. 11, 2001

(65) Prior Publication Data

US 2002/0196554 A1 Dec. 26, 2002

(51) Int. Cl.[7] ............................................. G02B 27/14
(52) U.S. Cl. .................... 359/633; 359/631; 359/630
(58) Field of Search ............... 359/478, 479, 359/462, 464, 649, 630, 629, 631, 632, 633, 650, 651, 793, 664, 641, 652–654, 433

(56) References Cited

U.S. PATENT DOCUMENTS

| 4,021,846 | A | | 5/1977 | Roese ........................ 358/92 |
|---|---|---|---|---|
| 4,651,201 | A | * | 3/1987 | Schoolman ................. 358/98 |
| 4,854,688 | A | | 8/1989 | Hayford et al. ............. 359/433 |
| 5,436,765 | A | | 7/1995 | Togino ........................ 359/631 |
| 5,506,705 | A | | 4/1996 | Yamamoto et al. ........... 359/40 |
| 5,572,229 | A | * | 11/1996 | Fisher ............................ 345/8 |
| 5,596,433 | A | | 1/1997 | Konuma ..................... 359/631 |
| 5,601,352 | A | * | 2/1997 | Okamura ..................... 353/31 |
| 5,903,395 | A | | 5/1999 | Rallison et al. ............. 359/630 |
| 5,959,780 | A | | 9/1999 | Togino et al. ............... 359/630 |
| 5,991,085 | A | | 11/1999 | Rallison et al. ............. 359/630 |
| 6,028,709 | A | | 2/2000 | Takahashi ................... 359/630 |
| 6,034,717 | A | | 3/2000 | Dentinger et al. ............ 348/51 |
| 6,057,966 | A | * | 5/2000 | Carroll et al. .............. 359/630 |
| 6,088,006 | A | * | 7/2000 | Tabata ............................ 345/7 |
| 6,097,354 | A | | 8/2000 | Takahashi et al. ............. 345/8 |
| 6,416,181 | B1 | * | 7/2002 | Kessler et al. ................. 353/7 |

* cited by examiner

Primary Examiner—Jordan M. Schwartz
Assistant Examiner—Jessica Stultz
(74) Attorney, Agent, or Firm—Nelson Adrian Blish

(57) ABSTRACT

A head-mounted optical apparatus (10) providing pupil imaging with a very wide field of view. The head-mounted optical apparatus (10) employs a monocentric arrangement of optical components providing stereoscopic display of a virtual image, electronically generated and projected as left and right images from curved surfaces (68). For each right and left image, a ball lens assembly (30) is used to project a displayed intermediate image from the curved display surface (68) toward a beamsplitter (16), which directs an intermediate image toward the front focal surface of a curved mirror (24) that collimates the image to form a virtual image. The beamsplitter (16) transmits the virtual image for each eye to the observer.

70 Claims, 5 Drawing Sheets

HEAD-MOUNTED OPTICAL APPARATUS FOR STEREOSCOPIC DISPLAY

FIELD OF THE INVENTION

This invention generally relates to head-mounted display systems for viewing electronically generated stereoscopic images and more particularly relates to an apparatus and method for an arrangement of optical components to provide a head-mounted optical apparatus that provides a very wide field of view and large exit pupils.

BACKGROUND OF THE INVENTION

The potential value of stereoscopic display systems is widely appreciated particularly in entertainment and simulation fields. An overall goal is to provide the most realistic display possible, within the constraints of a particular application. Realistic stereoscopic display is characterized by a number of quantifiable features, including wide field of view (horizontal and vertical), sharp image resolution, and sufficient brightness.

One alternative for stereoscopic imaging is provided by head-mounted displays (HMDs). Goggles, glasses, and similar eyewear have been used in a number of ways to provide compact, lightweight, and inexpensive head-mounted display apparatus for providing stereoscopic effects. Solutions using eyewear range from using lenses having different polarization filters for each eye, as is disclosed, for example, in U.S. Pat. No. 6,034,717 (Dentinger et al.), to using shutters that alternate between right and left eye visibility as is disclosed, for example, in U.S. Pat. No. 4,021,846 (Roese). An alternate shutter mechanism is a color shutter, as disclosed in U.S. Pat. No. 5,903,395 (Rallison et al.) which provides varying color filters at high frequencies. Solutions of this type can be economical, particularly when used to accommodate a large group of observers. However, the requirement for using a separate external display, such as a display screen or CRT, means that such solutions necessarily have a large footprint and are, therefore, not well suited for individual viewing. Thus, it can be seen that there are advantages to an eyewear arrangement in which the displayed stereoscopic image is contained within the head-mounted display itself.

There are numerous HMDs and face-mounted devices (FMDs) commercially available, offering either stereoscopic or non-stereoscopic imaging. One example of an HMD that provides stereoscopic imaging is the Cyber Eye CE 200S from iReality.com, Inc., Half Moon Bay, Calif. Another example is the Datavisor 80™ Wide Field-of-View Head Mounted Display from n-vision, Inc., McLean, Va. An HMD providing non-stereoscopic imaging is the Eye-Treck™, a product of Olympus Optical Company, Ltd., Tokyo, Japan.

While HMD devices that are currently available provide suitable imaging for some applications, there is room for improvement. For example, realistic stereoscopic imaging requires a wide field of view. However, existing devices are limited in this regard. The Cyber Eye CD 200S HMD, for example, claims a field of view limited to 22.5 degrees horizontal, 16.8 degrees vertical. The Eye-Treck HMD claims a field of view of less than 40 degrees horizontal, less than 22 degrees vertical. The Datavisor 80 device, while it claims a field of view of 120 degrees horizontal, is relatively large and is too expensive for most applications. The resolution of commercially available devices is also limited. Therefore, while image quality may be acceptable for some applications such as for computer monitor display, the performance level achieved by existing devices is not sufficient for a broader range of virtual reality applications.

Product literature from one HMD manufacturer (iReality.com, Inc. at www.ireality.com/hmds.html) states that sharp resolution and wide field-of-view imaging can be considered "mutually exclusive" for HMD design. Certainly, the difficulty of providing sharp resolution, wide field-of-view imaging in a compact, lightweight HMD is well-appreciated in the optical design arts and conventional solutions have made only modest improvements in obtaining realistic stereoscopic imaging. In the optical design arts, it is well understood that HMD design presents a number of strict constraints, with a number of optical parameters that are fixed and inflexible. Using a conventional approach to this type of optical design problem, the configuration of the Eye-Treck HMD employs a free-shaped, aspheric prism in order to provide an optics path having compact dimensions with minimal aberrations and image distortion. Aspheric design approaches are known to have particular value because they can allow an optical designer considerably more variables to work with than optics using more conventional spherical structures. However, aspheric design can present significant drawbacks relative to cost, design complexity, and overall flexibility of a design solution. For example, modification or scaling of an aspheric design solution may not be possible without considerable redesign. Examples of HMD devices based on aspheric optical components are disclosed in U.S. Pat. No. 6,028,709 (Takahashi) which discloses an HMD using a prism having rotationally asymmetric surfaces; U.S. Pat. No. 6,097,354 (Takahashi et al.); U.S. Pat. No. 5,436,765 (Togino) which discloses use of an aspherical mirror; U.S. Pat. No. 5,959,780 (Togino et al.); and U.S. Pat. No. 5,596,433 (Konuma) which discloses use of a beamsplitter having an aspherical surface as HMD component.

Spherical optics, on the other hand, present other problems to the HMD designer. Most notably, the image to be presented to an observer is conventionally provided on a flat surface. Spherical optics can require considerable design in order to compensate for image aberration and distortion that results from attempting to project a flat image using substantially spherical lenses. This difficulty is seen, for example, in the design disclosed in U.S. Pat. No. 5,903,395 (Rallison et al.) noted above, which discloses conventional lens design approaches to project an image from a flat surface. At the same time, however, it can be appreciated that there are advantages to the use of spherical optics, particularly with respect to availability, manufacturability, and cost. Additional potential advantages over aspherical approaches include scalability and flexibility of design when using spherical optics.

One example of an HMD design utilizing spherical optics is the pilot's helmet disclosed in U.S. Pat. No. 4,854,688 (Hayford et al.), directed to the transmission of a non-stereoscopic, two-dimensional image along a non-linear path, such as attached to headgear for a pilot. In the optical arrangement of the Hayford et al. patent, a ball lens, employed as a folding component and lens for providing a relatively wide field of view, directs a collimated output image, optically at infinity, for viewing by a pilot. This allows a pilot to view information projected from a small CRT screen without requiring change of gaze direction or refocusing. While the ball lens may provide some advantages for inherently wide field of view in the device disclosed in U.S. Pat. No. 4,854,688, there are a number of drawbacks to a design of this type. The tilted and decentered optics path of the disclosed device in U.S. Pat. No. 4,854, 688 inherently introduces image aberrations that require a considerable amount of correction. To compensate for off-axis imaging from a reflective or partially reflective collimator, a complex and costly relay lens assembly, tilted and decentered with respect to the optical path, are required. Relay optics of the type disclosed in the Hayford et al. patent, needed for such a compact arrangement, not only add cost, but also increase the bulk and weight of a head-mounted viewing device.

Imaging by forming a large pupil has particular advantages when providing an HMD solution with a wide field of view. However, with conventional lens design approaches, forming a large pupil inherently causes other problems, since the lens design must attempt to correct for the pupil as well as for the wide field. The lens system must not only be able to correct for on-axis aberrations (chiefly spherical aberration and axial chromatic aberration), but for off-axis aberrations as well, including coma, astigmatism, field curvature, and distortion, and chromatic lateral aberrations. Therefore, conventional lens design approaches do not yield simple solutions for correcting aberrations when providing a large pupil with a wide field of view.

Another well known problem in achieving wide field of view using conventional optics systems is illumination falloff due to the Cosine Fourth Law, in which image brightness is reduced at a rate proportional to $\cos^4$ of the off-axis field angle. This effect can detract from realistic appearance desired for an immersive experience.

Monocentric optical design has advantages for providing, using a straightforward optical arrangement, design solutions that perform well and inherently require a minimum of components. Ideally, a monocentric arrangement offers optimal performance for field of view with minimal distortion and image aberration. However, monocentric design of the optical path is difficult given the constraints of HMD design and has not, therefore, been employed successfully in conventional HMD design practices. Instead, existing HMD solutions are characterized by complex optical paths such as that presented in U.S. Pat. No. 4,854,688, limited field of view, high cost, and overall low image resolution.

Some HMDs display a real image, projected onto a screen surface, within the HMD itself, such as the goggles disclosed in U.S. Pat. No. 5,506,705 (Yamamoto et al.) However, designs of this type typically have inherent disadvantages relating to potential eyestrain and proper correlation of visual cues, such as vergence and accommodation, particularly since any type of display surface must be in close proximity to the eye of the observer. It is recognized that there can be advantages in an alternate approach in which, instead of a real image, a virtual image is presented to the observer. Visual cues for virtual imaging allow the observer to focus more naturally and provide inherently more realistic viewing conditions.

Thus it can be seen that there is a need for an improved, compact head-mounted display that provides a virtual image at a large pupil, with a wide field of view and sharp resolution, using a substantially monocentric optical design.

SUMMARY OF THE INVENTION

It is an object of the present invention to provide a compact, lightweight, and affordable head-mounted display that provides a wide field of view and sharp resolution. With this object in mind, the present invention provides a head-mounted display apparatus for viewing a composite virtual image, said composite virtual image comprising a left virtual image, formed from a left image, to be viewed by an observer at a left viewing pupil and a right virtual image, formed from a right image, to be viewed by the observer at a right viewing pupil, the head-mounted display apparatus comprising:

(a) an image generator for providing, as scene content data, the left image and the right image;

(b) a left image display for accepting from the image generator the scene content data for the left image and for displaying a first left intermediate image on a left curved surface;

(c) a left ball lens spaced apart from the left curved surface, the center of curvature of the left ball lens substantially coincident with a center of curvature of the left curved surface, the left ball lens having a left ball lens pupil, the left ball lens forming a second left intermediate image of the first left intermediate image;

(d) a right image display for accepting from the image generator the scene content data for the right image and for displaying a right intermediate image on a right curved surface;

(e) a right ball lens spaced apart from the right curved surface, the center of curvature of the right ball lens substantially coincident with a center of curvature of the right curved surface, the right ball lens having a right ball lens pupil, the right ball lens forming a second right intermediate image of the first right intermediate image;

(f) a beamsplitter means disposed to do the following:
 (1) reflect the second left intermediate image formed by the left ball lens towards a left curved mirror, the left curved mirror having its center of curvature optically coincident with the left ball lens, the left curved mirror disposed to form, through the beamsplitter, a real image of the left ball lens pupil at the left viewing pupil and a left virtual image of the second left intermediate image;
 (2) reflect the second right intermediate image directed from the right curved surface through the right ball lens towards a right curved mirror, the right curved mirror having its center of curvature optically coincident with the right ball lens, the right curved mirror disposed to form, through the beamsplitter, a real image of the right ball lens pupil at the right viewing pupil and a right virtual image of the second right intermediate image.

A feature of the present invention is the use of a ball lens assembly for projecting the image viewed by each eye.

A further feature of the present invention is the generation of an intermediate image having a spherical curvature that suits the projection of the intermediate image by a ball lens onto a mirror having spherical curvature.

An alternative feature of the present invention is the use of an optical component to provide spherical curvature to an intermediate image for projection by a ball lens.

It is an advantage of the present invention that it provides a virtual image to the observer. The observer enjoys a wide field of view, with minimal distortion and minimal aberrations in the projected image.

It is a further advantage of the present invention that it provides pupil imaging with a large pupil size for HMD applications.

It is a further advantage of the present invention that it employs a monocentric optical arrangement, which inherently minimizes image aberrations and distortion. The design of the preferred embodiment even allows an essentially concentric arrangement of optical components, with a separate optics path for each eye of the observer.

It is a further advantage of the present invention that it provides a wider field of view than is conventionally available at reasonable cost for HMD devices. Moreover, the arrangement of the present invention, because it employs ball lens optics, does not suffer the brightness degradation, due to the Cosine Fourth Law, common to conventional wide-field imaging optics.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
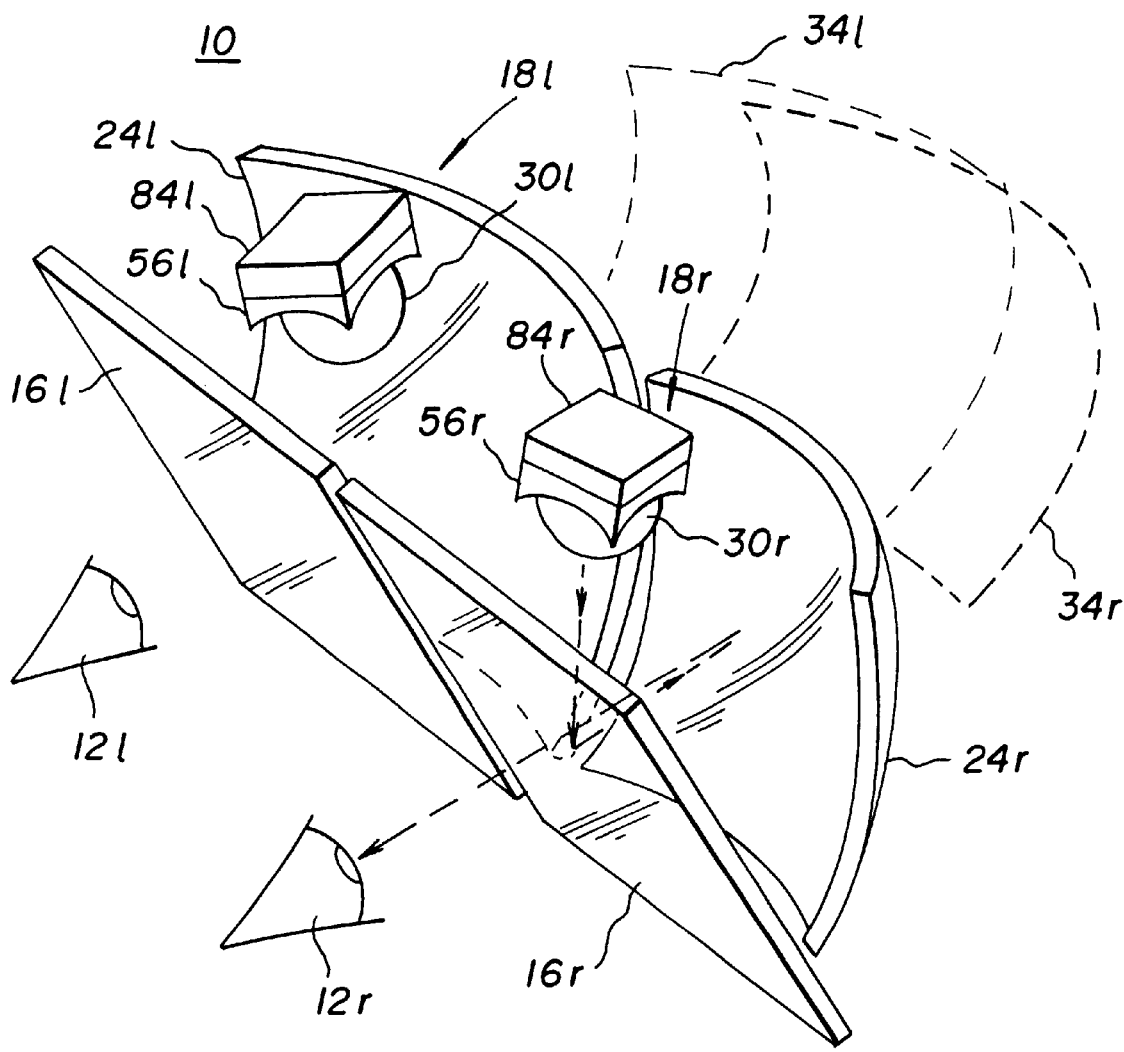
FIG. 1 is a perspective view showing the arrangement of optical components for the head-mounted display apparatus of the present invention.

Referring to FIG. 1, there is shown a perspective view of a head-mounted optical apparatus 10 of the present invention. The relative positions of a left eye 12*l* and a right eye 12*r* for an observer who is wearing head-mounted optical apparatus 10 are as shown in FIG. 1. As FIG. 1 shows, similar components are employed in the optics path for left eye 12*l* and right eye 12*r*. For providing an image for right eye 12*r*, a right image display 18*r* comprising a right flat image-forming emissive surface 84*r* coupled with a right fiber optic faceplate 56*r* displays an image that is projected by a right ball lens assembly 30*r* towards a right beamsplitter 16*r*. The image directed towards a right curved mirror 24*r* is then displayed to right eye 12*r*. Correspondingly, for providing an image for left eye 12*l*, a left image display 18*l* comprising a left flat image-forming emissive surface 84*l* coupled with a left fiber optic faceplate 56*l* displays an image that is projected by a left ball lens assembly 30*l* towards a left beamsplitter 16*l*. The image directed towards a left curved mirror 24*l* is then displayed to left eye 12*l*.

In general, the description that follows applies similarly to both left and right optics paths for head-mounted optical apparatus 10. For this reason, appended left "l" or right "r" designators are omitted from this description except where needed for clarity. It is also instructive to note that, while the preferred embodiment employs separate left and right beamsplitters 16*l* and 16*r*, a single component could be used to serve as beamsplitter 16 for both left and right optical paths.

Figure 2A:
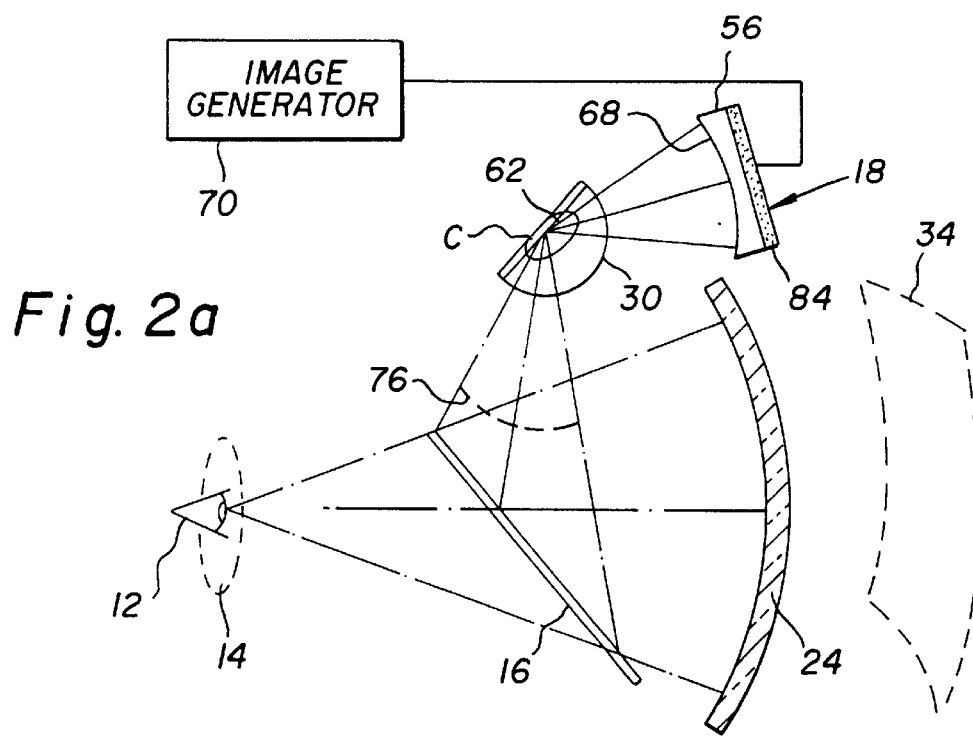
FIGS. 2a and 2b are side views showing the interaction of key optics path components and data path components for each eye, in two different embodiments.
Figure 2B:
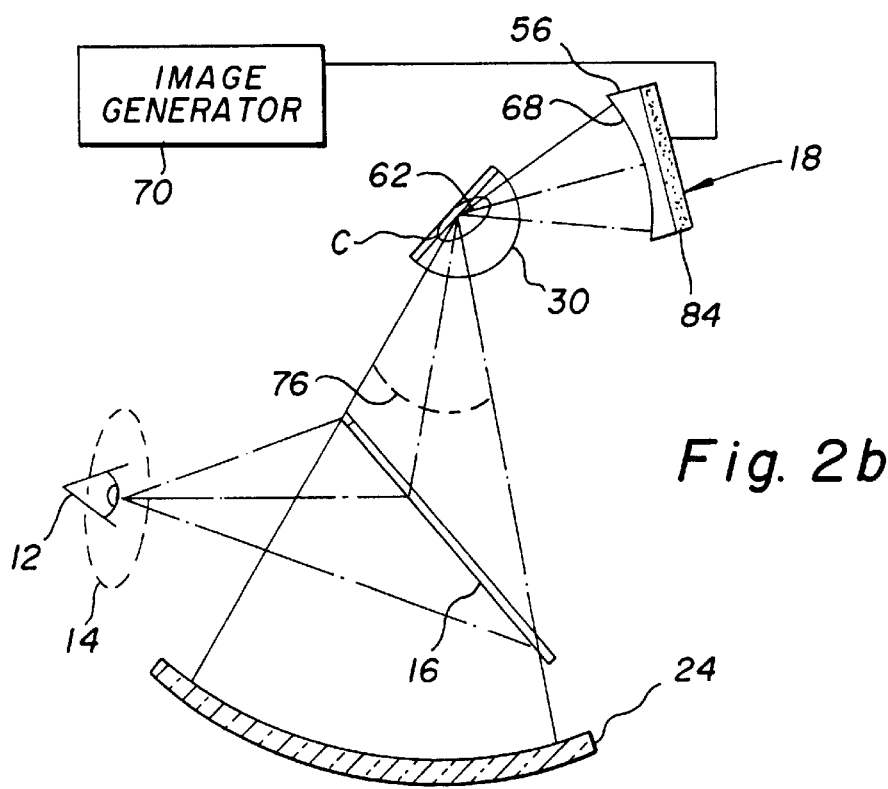

Keeping this dual arrangement in mind, FIGS. 2a and 2b show schematic block diagrams of two alternate configurations of components of head-mounted optical apparatus 10. FIGS. 2a and 2b show different embodiments in which beamsplitter 16 and curved mirror 24 cooperate to form pupil 14. Referring to the preferred embodiment of FIG. 2a, an image generator 70, such as a personal computer or other digitally controlled device for electronic image processing, generates scene content for left and right image paths from an image source (not shown). For each image path, image generator 70 provides image data to image display 18. Components for one image path are shown; identical components are used for both left-eye and right-eye images as is noted above. As suggested in FIGS. 1, 2a and 2b, each image display 18 preferably has a curved display surface 68 on which the generated image is displayed, as a displayed intermediate image, for projection by ball lens assembly 30. In the embodiments shown, ball lens 30 may be formed as half sphere with a mirrored surface, which, optically, acts as a full sphere. As is described subsequently, formation of this displayed intermediate image on a curved surface has advantages over conventional image display on a flat surface. Ball lens assembly 30 serves as folding and projection optics, projecting the displayed intermediate image from curved display surface 68 towards beamsplitter 16. Beamsplitter 16 reflects the projected light to form a projected intermediate image 76, a real image, having a center of curvature that is optically coincident with the center of curvature of ball lens assembly 30. Significantly, projected intermediate image 76 is formed to be optically at or near the focal surface of curved mirror 24. As a result, curved mirror 24 collimates projected intermediate image 76 to form a virtual image, represented in FIGS. 2a and 2b as if at an apparent virtual image position 34. It then appears to the observer that the viewed scene content is at a distance behind curved mirror 24, the image visually appearing to lie between curved mirror 24 and infinity. The observer's eye 12 is substantially at the position of a viewing pupil 14. To accommodate a wide field and normal eye movement, it can be appreciated that it is advantageous that pupil 14 be as large as possible.

Referring to FIG. 2b, an alternate embodiment employs beamsplitter 16 to transmit the projected light from ball lens assembly 30 and reflect light from curved mirror 24. The arrangement of FIG. 2a, with curved mirror 24 vertically disposed has advantages over the arrangement of FIG. 2b for conventional HMD design; however, the arrangement of FIG. 2b may have advantages for see-through applications.

Some advantages of monocentric optical design were noted in the background material above. Referring to the side view of FIGS. 2a and 2b, it can be seen that both right and left optical paths are, essentially, optically concentric. As represented in FIGS. 2a and 2b, beamsplitter 16 and curved mirror 24 cooperate to form a real image of a ball lens pupil 62 of ball lens 30 at viewing pupil 14. (Subsequent description gives additional detail on how ball lens pupil 62 is formed.) This concentric arrangement of optical components provides an ideal arrangement for displaying, as a virtual image, the real intermediate image that is initially formed on curved display surface 68. The benefits of such a concentric arrangement of optical components can be appreciated, since such an arrangement provides inherent advantages for minimizing image aberration and distortion and for requiring a minimum number of optical components.

In keeping to the concentric arrangement of the preferred embodiment of the present invention, curved mirror 24 is spherically curved. However, there may be advantages in altering this curvature characteristic, providing curved mirror 24 as aspheric to suit other requirements for the optical path. Curved mirror 24 could alternately be embodied as a Fresnel mirror, having the effective optical curvature needed to emulate an actual curved reflective surface.

Image generator 70 provides electronic image data to image display 18. The image data generated can be from any of a number of sources, including a computer-generated image, images from film or from a digital camera, or images from a video camera, for example. In a preferred embodiment, the left-and right-eye images are stereoscopic in relationship. Referring back to FIG. 1, this means that the virtual image formed at left and right apparent virtual image positions 34l and 34r form a composite virtual image. However, it must be noted that the arrangement of head-mounted display apparatus 10 also permits the display of non-stereoscopic images.

Operation of Ball Lens Assembly 30

Figure 3:
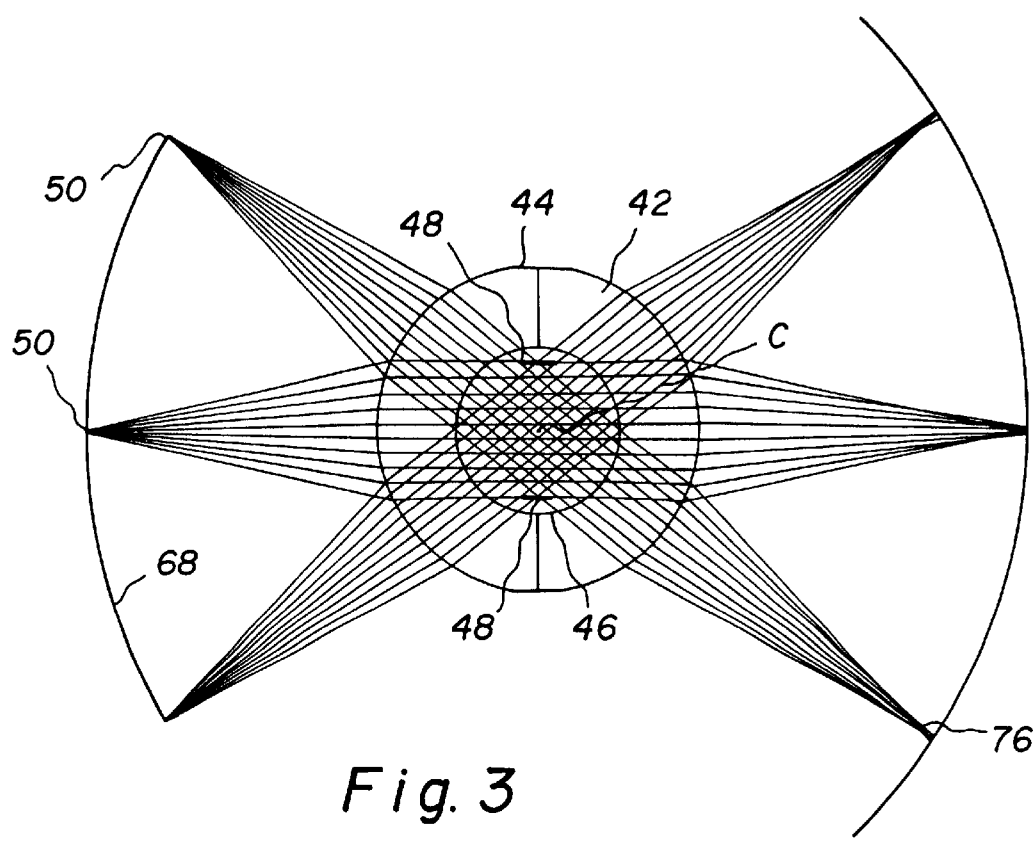
FIG. 3 is a cutaway side view of a ball lens assembly used in the optics path of the apparatus.

Ball lens assembly 30l/30r functions as the projection lens for its associated left or right optical system. Referring to FIG. 3, there is shown the concentric arrangement provided for each ball lens assembly 30. A central spherical lens 46 is disposed between meniscus lenses 42 and 44, where meniscus lenses 42 and 44 have indices of refraction and other characteristics intended to minimize on-axis spherical and chromatic aberration, as is well known in the optical design arts. Stop 48 limits the entrance pupil within ball lens assembly 30. Stop 48 need not be physical, but may alternately be implemented using optical effects such as total internal reflection. In terms of the optics path, stop 48 serves to define ball lens pupil 62 (FIG. 2a) for ball lens assembly 30. As shown in FIGS. 2a and 2b, ball lens 30 could be a hemisphere, used as a folding element in the optical path.

In a preferred embodiment, meniscus lenses 42 and 44 are selected to reduce image aberration and to optimize image quality for the image projected toward curved mirror 24. It must be noted that ball lens assembly 30 could comprise any number of arrangements of support lenses surrounding central spherical lens 46. Surfaces of these support lenses, however many are employed, would share a common center of curvature C with central spherical lens 46. Moreover, the refractive materials used for lens components of ball lens assembly 30 could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could comprise a single central spherical lens 46, without additional supporting refractive components.

Referring again to FIG. 3, there is shown how ball lens assembly 30 operates to provide wide field-of-view imaging with minimal image aberrations or distortion. From any point source 50 on curved display surface 68, ball lens assembly 30 can be considered optically "on axis" so that light from each point source 50 is projected to a corresponding point within projected intermediate image 76. Where curved display surface 68 shares its center of curvature with center of curvature C of ball lens assembly 30, the resulting projected intermediate image 76, because it also shares a center of curvature with ball lens assembly 30, will have, inherently, minimal aberration.

Referring again to FIG. 3, it can be appreciated that another benefit of ball lens imaging relates to image brightness over a wide field. Because all object points on curved display surface 68 are optically on-axis, the Cosine Fourth Law for illumination falloff does not apply. Realistic brightness levels can thus be maintained, even at the "edges" of the image field. Additionally, there is no inherent vignetting at the extreme edges of the image field due to imaging optics. Moreover, unlike conventional wide-field optics in which the effective pupil shape becomes elliptical for extreme off-axis points, ball lens pupil 62 (as shown in FIGS. 2a and 2b) remains circular for all object points on curved surface 68.

Curved Display Surface 68: Preferred and Alternate Solutions

Figure 8:
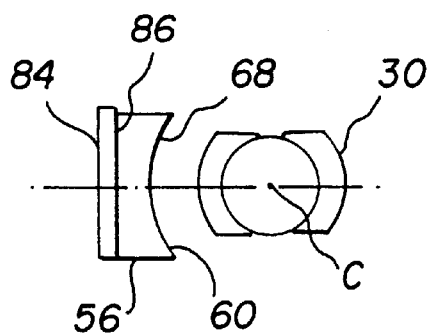
FIG. 8 is a side view showing an alternate arrangement of display components in the optics path, in which a fiber optic faceplate is employed for generating a displayed intermediate image; and, FIG. 9 is a side view showing an alternate arrangement of display components in the optics path, using a tapered fiber optic faceplate.

In order to allow a monocentric arrangement of optical components, image display 18 advantageously provides the displayed intermediate image on curved display surface 68. In a preferred embodiment, curved display surface 68 is formed using a combination comprising flat image-forming emissive surface 84 and fiber optic faceplate 56 as shown in FIG. 8. Flat image-forming emissive surface 84 could be a device such as an Organic Light Emitting Diode (OLED) display, available from eMagin Corporation, Hopewell Junction, N.Y. Similarly, Polymer Light Emitting Diode (PLED) technology could be employed. For this application, OLED or PLED array display technology offer an image available on a flat surface 86. To provide curvature to the image, fiber optic faceplate 56, using a device such as the faceplates manufactured by Incom, Inc., Charlton, Mass., transfers the image from flat surface 86 to an output concave surface 60. Output concave surface 60 faces ball lens 30 and is concentric with center C of ball lens assembly 30. Additionally, fiber optic faceplate 56 may be treated in some fashion, such as by being coated or roughened, in order to provide a diffusive surface for curved display surface 68.

Figure 9:
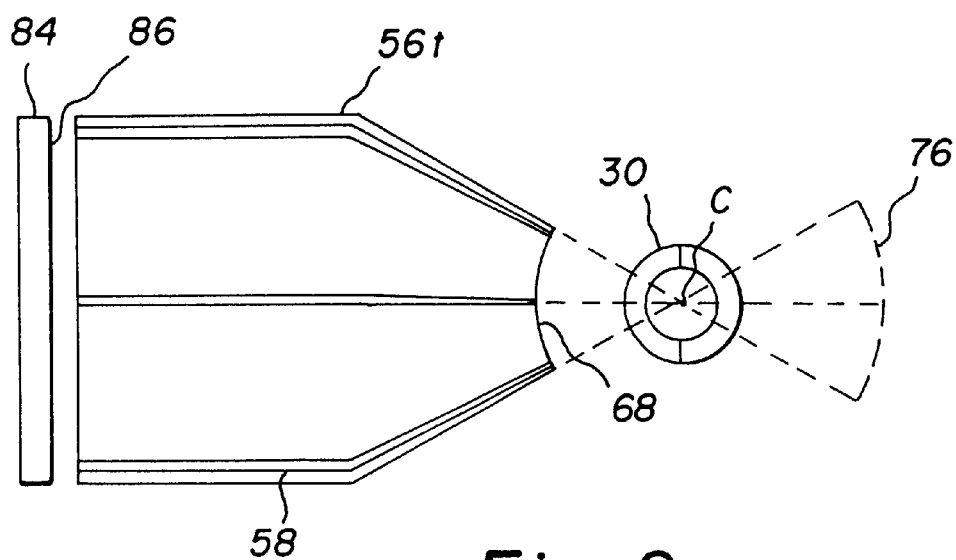

Referring to FIG. 9, an image could be formed using a tapered fiber optic faceplate 56t, particularly where magnification or demagnification of the image from flat surface 86 is desirable. Tapered fiber optic faceplates, such as those available from Schott Corporation, Southbridge, Mass., could be provided with curved display surface 68, so that the light that is directed from each individual optical fiber 58 toward ball lens assembly 30 is substantially normal to the surface of ball lens assembly 30. Such an arrangement would help to minimize or eliminate vignetting at off-axis field points.

In an alternate embodiment, it would be advantageous to provide curvature directly to the OLED, PLED, or other component that otherwise serves as emissive surface 84. Such an arrangement would eliminate the need for a separate component to provide curvature, such as fiber optic faceplate 56. Alternately, an OLED device could be fabricated directly on fiber optic faceplate 56 to create an emissive device having the appropriate spherical curvature.

Figure 4:
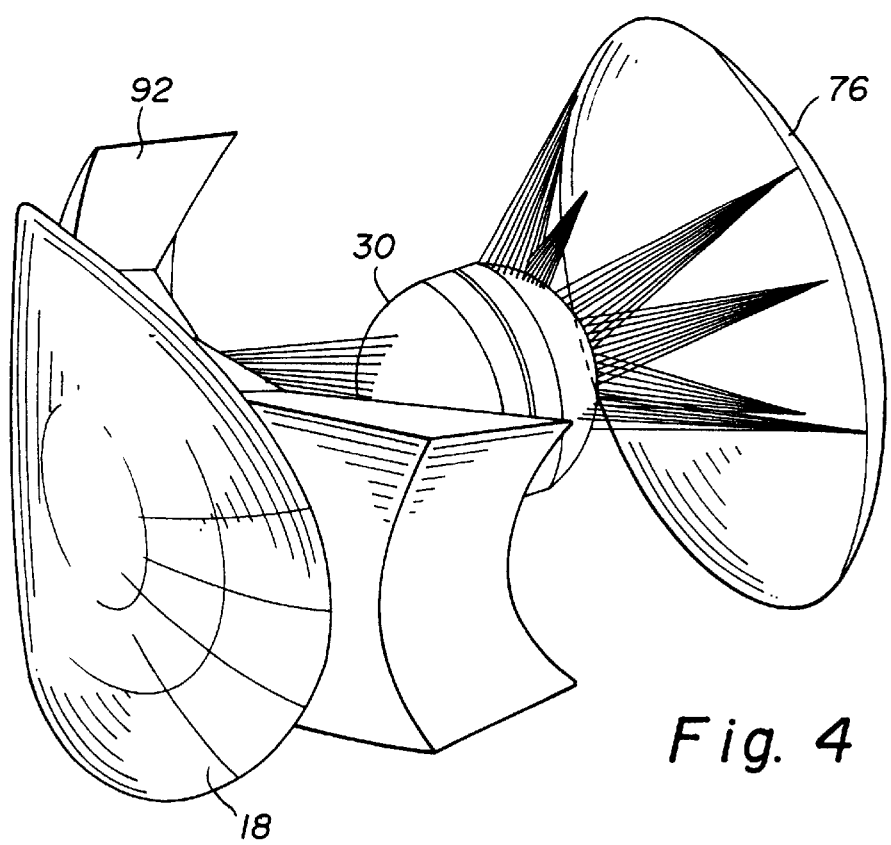
FIG. 4 is a perspective view showing an alternate arrangement of optical components for the head-mounted display apparatus of the present invention.

It may be difficult or costly, however, to provide spherical curvature to image display 18 itself. In such a case, there are other alternative solutions for modifying the output of image display 18 in order to provide the necessary curvature for curved display surface 68, so that the displayed intermediate image presented to ball lens assembly 30 has essentially spherical curvature. Referring to FIG. 4, there is shown an alternative embodiment, in which image display 18 is cylindrically curved. For the embodiment of FIG. 4, curved display surface 68 has the desired curvature only along one axis. To compensate and provide the desired curvature for the displayed intermediate image, a toroidal lens 92 is disposed between image display 18 and ball lens assembly 30. This provides the necessary curvature so that projected intermediate image 76 has spherical shape.

Figure 5:
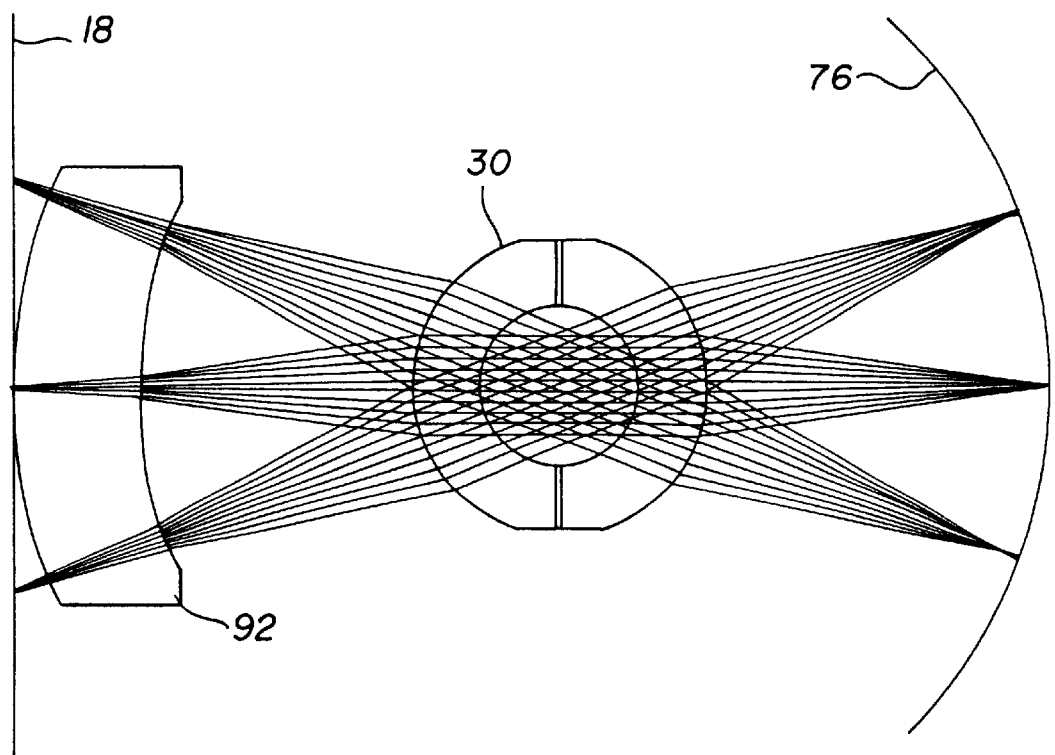
FIG. 5 is a side view showing the relationship of optical components for the alternate arrangement of FIG. 5.
Figure 6:
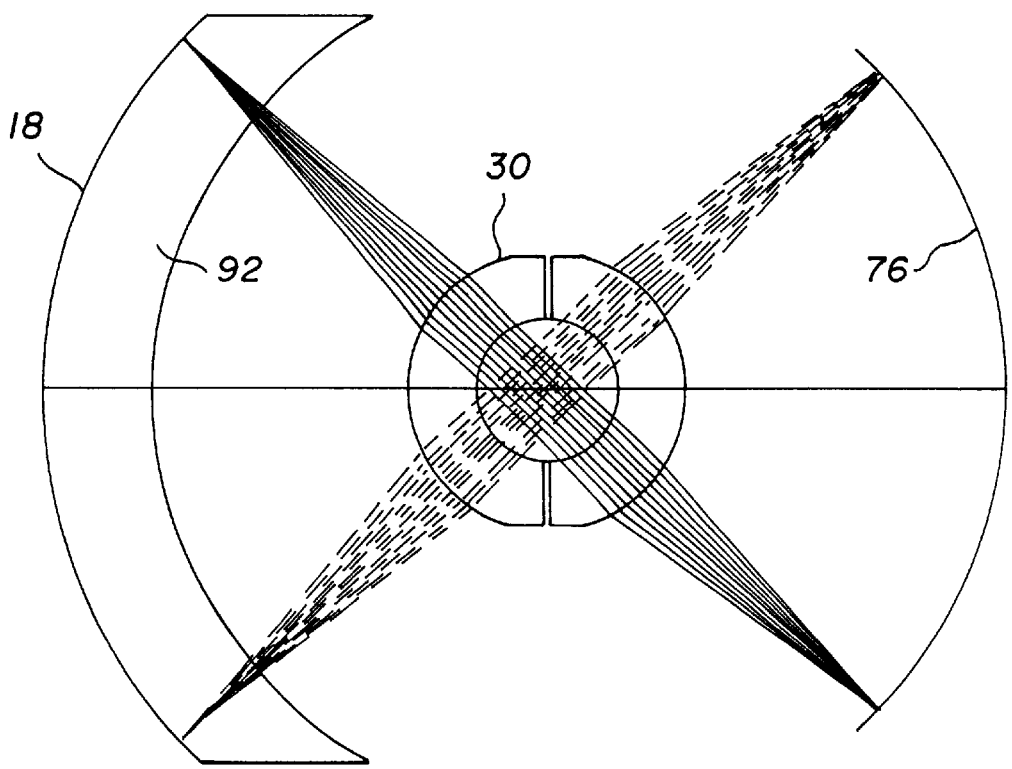
FIG. 6 is a top view showing the relationship of optical components for the alternate arrangement of FIG. 5.

Referring to FIG. 5, there is shown a side view representation of the optical arrangement of FIG. 4. Referring to FIG. 6, there is shown a top view representation of the optical arrangement of FIG. 4.

Figure 7:
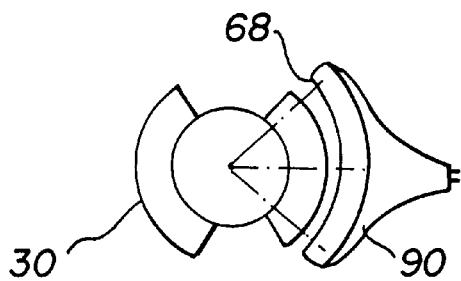
FIG. 7 is a side view showing an alternate arrangement of display components in the optics path, in which a cathode-ray tube is employed for generating a displayed intermediate image.

As an alternative type of image-forming emissive surface 84, a miniature cathode-ray tube (CRT) 90 could be employed as image display 18, as is shown in FIG. 7. This would require a change of curvature from standard off-the-shelf CRT manufacture, to provide the proper shape for curved display surface 68. Alternately, fiber optic faceplate 56 could be used in combination with a flat cathode-ray tube 90.

The present invention provides a lightweight head-mounted display apparatus with high performance and low cost, using a minimum number of components. The apparatus of the present invention is capable of providing a wide field of view at approximately 90 degrees horizontal and 50 degrees vertical with a pupil size of approximately 12 mm. Moreover, the concentric design of the apparatus of the present invention allows straightforward scalability of the design so that the apparatus can be used in a number of possible face- and head-mounted arrangements.

Unlike conventional HMD designs for which lens systems must compromise between pupil imaging and achieving a wide field of view, the optically concentric apparatus of the present invention, using ball lens assembly 30, effectively provides an identical optical path for every field point. As a result, the present invention provides an apparatus that requires a minimum of correction for monochromatic and chromatic aberration.

Other Alternate Embodiments

The present invention allows a number of other alternate embodiments. For example, the present invention could be employed in any number of head-mounted or face-mounted arrangements including goggles, helmets, and the like. An HMD using the optical configuration of the present invention could be further enhanced by the addition of audio transducers, for example.

There are a number of alternative devices that could be employed as part of image display 18. One alternative device could be a Digital Micromirror Device (DMD), available from Texas Instruments, Inc., Dallas, Tex.

Improvements can be provided to basic imaging by providing head tracking as is disclosed in U.S. Pat. No. 5,991,085 (Rallison et al.), for example. Tracker technologies using a sensor such as a mechanical, magnetic, ultrasonic, or optical sensor could be employed in order to detect head movement. Additional sensors such as gravimetric and inertial sensors could be used for applications such as in simulator apparatus, where detection of acceleration, pitch, yaw, and roll would be useful. Using data from head tracking and related sensing technologies, image generator 70 could adapt the images displayed to left and right viewing pupils 14*l*/14*r* in order to adjust the image scene content appropriately for the application.

Polarization characteristics could also be used to improve contrast and light efficiency of an HMD using the design of the present invention. Referring back to the side view of FIG. 2*a*, for example, a polarizing beamsplitter could be used for beamsplitter 16 with a quarter-wavelength retarder placed in front of curved mirror 24. Polarization direction for light incident on the polarizing beamsplitter would be chosen so that this light is completely reflected by the beamsplitter. After a double pass through the quarter-wavelength retarder, the polarization of the light would be rotated by 90 degrees, enabling the light to be completely transmitted through the beamsplitter to observer 12.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. Thus, what is provided is a head-mounted display apparatus for viewing electronically generated stereoscopic images having a wide field of view and large exit pupils.

PARTS LIST

| | |
|---|---|
| 10. | Head-mounted optical apparatus |
| 12. | Eye |
| 12l. | Left eye |
| 12r. | Right eye |
| 14. | Viewing pupil |
| 16. | Beamsplitter |
| 16l. | Left beamsplitter |
| 16r. | Right beamsplitter |
| 18. | Image display |
| 18l. | Left image display |
| 18r. | Right image display |
| 24. | Curved mirror |
| 24l. | Left curved mirror |
| 24r. | Right curved mirror |
| 30. | Ball lens assembly |
| 30l. | Left ball lens assembly |
| 30r. | Right ball lens assembly |
| 34. | Apparent virtual image position |
| 34l. | Left apparent virtual image position |
| 34r. | Right apparent virtual image position |
| 42. | Meniscus lens |
| 44. | Meniscus lens |
| 46. | Spherical lens |
| 48. | Stop |
| 50. | Point source |
| 56. | Fiber optic faceplate |
| 56l. | Left fiber optic faceplate |
| 56r. | Right fiber optic faceplate |
| 56t. | Tapered fiber optic faceplate |
| 58. | Optical fiber |
| 60. | Output concave surface |
| 62. | Ball lens pupil |

-continued

PARTS LIST

| | | |
|---|---|---|
| 68. | Curved display surface | |
| 70. | Image generator | |
| 76. | Projected intermediate image | |
| 84. | Flat image-forming emissive surface | |
| 84l. | Left flat image-forming emissive surface | |
| 84r. | Right image-forming emissive surface | |
| 86. | Flat surface | |
| 90. | Miniature cathode-ray tube (CRT) | |
| 92. | Toroidal lens | |

What is claimed is:

1. A head-mounted display apparatus for viewing a composite virtual image, said composite virtual image comprising a left virtual image, formed from a left image, to be viewed by an observer at a left viewing pupil and a right virtual image, formed from a right image, to be viewed by the observer at a right viewing pupil, the head-mounted display apparatus comprising:
    (a) an image generator for providing, as scene content data, said left image and said right image;
    (b) a left image display for accepting from said image generator said scene content data for said left image and for displaying a first left intermediate image on a left curved surface;
    (c) a left ball lens spaced apart from said left curved surface, a center of curvature of said left ball lens substantially coincident with a center of curvature of said left curved surface, said left ball lens having a left ball lens pupil, said left ball lens forming a second left intermediate image of said first left intermediate image;
    (d) a right image display for accepting from said image generator said scene content data for said right image and for displaying a right intermediate image on a right curved surface;
    (e) a right ball lens spaced apart from said right curved surface, the center of curvature of said right ball lens substantially coincident with a center of curvature of said right curved surface, said right ball lens having a right ball lens pupil, said right ball lens forming a second right intermediate image of said first right intermediate image;
    (f) a beamsplitter disposed to do the following:
        (1) direct said second left intermediate image formed by said left ball lens towards a left curved mirror, said left curved mirror having a center of curvature optically coincident with said center of curvature and said left ball lens, said left curved mirror disposed to form, through said beamsplitting means, a real image of said left ball lens pupil at said left viewing pupil and a left virtual image of said second left intermediate image;
        (2) direct said second right intermediate image directed from said right curved surface through said right ball lens towards a right curved mirror, said right curved mirror having its center of curvature optically coincident with said right ball lens, said right curved mirror disposed to form, through said beamsplitting means, a real image of said right ball lens pupil at said right viewing pupil and a right virtual image of said second right intermediate image.

2. The head-mounted display apparatus of claim 1 wherein said composite virtual image is a stereoscopic image.

3. The head-mounted display apparatus of claim 1 wherein said left image display comprises a liquid crystal device.

4. The head-mounted display apparatus of claim 1 wherein said beamsplitter comprises a left beamsplitter and a right beamsplitter.

5. The head-mounted display apparatus of claim 1 wherein said left image display comprises a light-emitting diode.

6. The head-mounted display apparatus of claim 1 wherein said left image display comprises a cathode-ray tube.

7. The head-mounted display apparatus of claim 1 wherein said left image display comprises an organic light emitting diode.

8. The head-mounted display apparatus of claim 1 wherein said left image display comprises a polymer light emitting diode.

9. The head-mounted display apparatus of claim 1 wherein said left image display comprises a digital micromirror device.

10. The head-mounted display apparatus of claim 1 wherein said right image display comprises a light-emitting diode.

11. The head-mounted display apparatus of claim 1 wherein said right image display comprises a cathode-ray tube.

12. The head-mounted display apparatus of claim 1 wherein said right image display comprises an organic light emitting diode.

13. The head-mounted display apparatus of claim 1 wherein said right image display comprises a polymer light emitting diode.

14. The head-mounted display apparatus of claim 1 wherein said right image display comprises a digital micromirror device.

15. The head-mounted display apparatus of claim 1 wherein said left curved surface is spherically curved.

16. The head-mounted display apparatus of claim 1 wherein said right curved surface is spherically curved.

17. The head-mounted display apparatus of claim 1 wherein said left curved surface is cylindrically curved.

18. The head-mounted display apparatus of claim 1 wherein said right curved surface is cylindrically curved.

19. The head-mounted display apparatus of claim 17 further comprising a corrective lens disposed between said left curved surface and said left ball lens.

20. The head-mounted display apparatus of claim 18 further comprising a corrective lens disposed between said right curved surface and said right ball lens.

21. The head-mounted display apparatus of claim 19 wherein said corrective lens is substantially toroidal.

22. The head-mounted display apparatus of claim 20 wherein said corrective lens is substantially toroidal.

23. The head-mounted display apparatus of claim 1 wherein said left image display comprises a fiber optic faceplate.

24. The head-mounted display apparatus of claim 1 wherein said right image display comprises a fiber optic faceplate.

25. The head-mounted display apparatus of claim 1 further comprising at least one audio transducer.

26. The head-mounted display apparatus of claim 1 wherein said beamsplitter comprises a polarizing beamsplitter.

27. The head-mounted display apparatus of claim 1 further comprising a quarter waveplate disposed before said left curved mirror.

28. The head-mounted display apparatus of claim 1 further comprising a quarter waveplate disposed before said right curved mirror.

29. The head-mounted display apparatus of claim 1 wherein said left curved mirror comprises a Fresnel mirror.

30. The head-mounted display apparatus of claim 1 wherein said right curved mirror comprises a Fresnel mirror.

31. The head-mounted display apparatus of claim 1 wherein said left ball lens comprises a central spherical lens.

32. The head-mounted display apparatus of claim 20 wherein said left ball lens further comprises at least one meniscus lens, wherein both surfaces of said meniscus lens share a common center of curvature with said central spherical lens.

33. The head-mounted display apparatus of claim 20 wherein said central spherical lens comprises a refractive liquid.

34. The head-mounted display apparatus of claim 1 wherein said right ball lens comprises a central spherical lens.

35. The head-mounted display apparatus of claim 34 wherein said right ball lens further comprises at least one meniscus lens, wherein both surfaces of said meniscus lens share a common center of curvature with said central spherical lens.

36. The head-mounted display apparatus of claim 34 wherein said central spherical lens comprises a refractive liquid.

37. The head-mounted display apparatus of claim 1 further comprising a head tracker.

38. The head-mounted display apparatus of claim 23 wherein said fiber optic faceplate is treated to provide said left curved surface as a diffusive surface.

39. The head-mounted display apparatus of claim 24 wherein said fiber optic faceplate is treated to provide said right curved surface as a diffusive surface.

40. The head-mounted display apparatus of claim 23 wherein said fiber optic faceplate is a tapered fiber optic faceplate.

41. The head-mounted display apparatus of claim 24 wherein said fiber optic faceplate is a tapered fiber optic faceplate.

42. The head-mounted display apparatus of claim 7 wherein said organic light emitting diode is fabricated onto a fiber optic faceplate.

43. The head-mounted display apparatus of claim 12 wherein said organic light emitting diode is fabricated onto a fiber optic faceplate.

44. The head-mounted display apparatus of claim 1 wherein said left ball lens and said right ball lens are hemispheres which form folding elements.

45. In a head-mounted apparatus, a method for providing a composite virtual image, said composite virtual image comprising a left virtual image, formed from a left image, to be viewed by an observer at a left viewing pupil and a right virtual image, formed from a right image, to be viewed by an observer at a right viewing pupil, the method comprising:
(a) generating, from an image source, said left image and said right image;
(b) displaying said left image on a left curved surface as a first left intermediate image and displaying said right image on a right curved surface as a first right intermediate image;
(c) projecting said first left intermediate image through a left ball lens, said left ball lens spaced apart from said left curved surface, said left ball lens having a center of curvature substantially coincident with a center of curvature of said left curved surface, said left ball lens having a left ball lens pupil, said left ball lens forming a second left intermediate image of said first left intermediate image;
(d) projecting said first right intermediate image through a right ball lens, said right ball lens spaced apart from said right curved surface, said right ball lens having a center of curvature substantially coincident with a center of curvature of said right curved surface, said right ball lens having a right ball lens pupil, said right ball lens forming a second right intermediate image of said first right intermediate image;
(e) directing said second left intermediate image formed by said left ball lens towards a left curved mirror, said left curved mirror having its center of curvature optically coincident with said left ball lens, said left curved mirror disposed to form a real image of said left ball lens pupil at said left viewing pupil and a left virtual image of said second left intermediate image;
(f) directing said second right intermediate image directed from said right curved surface through said right ball lens towards a right curved mirror, said right curved mirror having its center of curvature optically coincident with said right ball lens, said right curved mirror disposed to form a real image of said light ball lens pupil at said right viewing pupil and a right virtual image of said second right intermediate image.

46. The method of claim 45 wherein the step of directing said second left intermediate image comprises the steps of reflecting said second left intermediate image using a beamsplitter.

47. The method of claim 45 wherein the step of directing said second right intermediate image comprises the steps of reflecting said second right intermediate image using a beamsplitter.

48. The method of claim 45 wherein the step of displaying said left image on a left curved surface comprises the step of displaying said left image on a liquid crystal device.

49. The method of claim 45 wherein the step of displaying said left image on a left curved surface comprises the step of displaying said left image on a light-emitting diode.

50. The method of claim 45 wherein the step of displaying said left image on a left curved surface comprises the step of displaying said left image on a cathode-ray tube.

51. The method of claim 45 wherein the step of displaying said left image on a left curved surface comprises the step of displaying said left image on an organic light-emitting diode.

52. The method of claim 45 wherein the step of displaying said left image on a left curved surface comprises the step of displaying said left image on a polymer light emitting diode.

53. The method of claim 45 wherein the step of displaying said left image on a left curved surface comprises the step of displaying said left image on a digital micromirror device.

54. The method of claim 45 wherein the step of displaying said right image on a right curved surface comprises the step of displaying said right image on a liquid crystal device.

55. The method of claim 45 wherein the step of displaying said right image on a right curved surface comprises the step of displaying said right image on a light-emitting diode.

56. The method of claim 45 wherein the step of displaying said right image on a right curved surface comprises the step of displaying said right image on a cathode-ray tube.

57. The method of claim 45 wherein the step of displaying said right image on a right curved surface comprises the step of displaying said right image on an organic light-emitting diode.

58. The method of claim 45 wherein the step of displaying said right image on a right curved surface comprises the step of displaying said right image on a polymer light emitting diode.

59. The method of claim 45 wherein the step of displaying said right image on a right curved surface comprises the step of displaying said right image on a digital micromirror device.

60. The method of claim 45 wherein the step of displaying said left image on a left curved surface comprises the step of displaying said left image on a spherically curved surface.

61. The method of claim 45 wherein the step of displaying said left image on a left curved surface comprises the step of displaying said left image on a cylindrically curved surface.

62. The method of claim 45 wherein the step of displaying said right image on a right curved surface comprises the step of displaying said right image on a spherically curved surface.

63. The method of claim 45 wherein the step of displaying said right image on a right curved surface comprises the step of displaying said right image on a cylindrically curved surface.

64. The method of claim 45 further comprising the step of tracking eye movement of the observer.

65. The method of claim 45 wherein the step of displaying said left image on a left curved surface comprises the step of displaying said left image on a coated surface.

66. The method of claim 45 wherein the step of displaying said right image on a right curved surface comprises the step of displaying said right image on a coated surface.

67. The method of claim 45 wherein the step of displaying said left image on a left curved surface comprises the step of displaying said left image on a roughened surface.

68. The method of claim 45 wherein the step of displaying said right image on a right curved surface comprises the step of displaying said right image on a roughened surface.

69. A head-mounted display apparatus for viewing a composite virtual image, said composite virtual image comprising a left virtual image, formed from a left image, to be viewed by an observer at a left viewing pupil and a right virtual image, formed from a right image, to be viewed by the observer at a right viewing pupil, the head-mounted display apparatus comprising:

(a) an image generator for providing, as scene content data, said left image and said right image;

(b) a left image display for accepting from said image generator said scene content data for said left image and for displaying a first left intermediate image on a left curved surface;

(c) a left ball lens spaced apart from said left curved surface, the center of curvature of said left ball lens substantially coincident with a center of curvature of said left curved surface, said left ball lens having a left ball lens pupil, said left ball lens forming a second left intermediate image of said first left intermediate image;

(d) a right image display for accepting from said image generator said scene content data for said right image and for displaying a right intermediate image on a right curved surface;

(e) a right ball lens spaced apart from said right curved surface, the center of curvature of said right ball lens substantially coincident with a center of curvature of said right curved surface, said right ball lens having a right ball lens pupil, said right ball lens forming a second right intermediate image of said first right intermediate image;

(f) A left beamsplitter which directs said second left intermediate image formed by said left ball lens towards a left curved mirror, said left curved mirror having its center of curvature of said left ball lens, said left curved mirror disposed to form a real image of said left ball lens pupil at said left viewing pupil and a left virtual image of said second left intermediate image;

(g) a right beamsplitter which directs said second right intermediate image directed from said right curved surface through said right ball lens towards a right curved mirror, said right curved mirror having its center of curvature optically coincedent with said center of curvature of said right ball lens, said right curved mirror disposed to form a real image of said right ball lens pupil at said right viewing pupil and a right virtual image of said second right intermediate image.

70. The head mounted display of claim 45 wherein said left ball lens and said right ball lens are hemispheres which provide an optical fold.

* * * * *